United States Patent
Ferreira et al.

(10) Patent No.: US 10,038,201 B2
(45) Date of Patent: Jul. 31, 2018

(54) FUEL CELL COMPONENT WITH EMBEDDED POWER CONNECTOR

(75) Inventors: David Melo Ferreira, Glastonbury, CT (US); Christopher John Carnevale, Vernon, CT (US); Glenn Michael Allen, Vernon, CT (US)

(73) Assignee: AUDI AG, Ingolstadt (DE)

( * ) Notice: Subject to any disclaimer, the term of this patent is extended or adjusted under 35 U.S.C. 154(b) by 891 days.

(21) Appl. No.: 13/495,353

(22) Filed: Jun. 13, 2012

(65) Prior Publication Data

US 2013/0337363 A1    Dec. 19, 2013

(51) Int. Cl.
- *H01M 8/24* (2016.01)
- *H01M 8/02* (2016.01)
- *H01M 8/0204* (2016.01)
- *H01M 8/2465* (2016.01)
- *H01M 8/249* (2016.01)

(52) U.S. Cl.
CPC ....... *H01M 8/0204* (2013.01); *H01M 8/2465* (2013.01); *H01M 8/249* (2013.01)

(58) Field of Classification Search
CPC ... H01M 8/2465; H01M 8/249; H01M 8/0204
See application file for complete search history.

(56) References Cited

U.S. PATENT DOCUMENTS

| | | | |
|---|---|---|---|
| 4,343,690 A * | 8/1982 | de Nora | C25B 1/46 204/263 |
| 6,001,502 A | 12/1999 | Walsh | |
| 7,709,131 B2 * | 5/2010 | Kubota | H01M 8/0221 429/514 |
| 8,871,379 B2 * | 10/2014 | Gan | H01M 4/06 29/623.1 |
| 2006/0024559 A1 | 2/2006 | Benthem et al. | |
| 2007/0178353 A1 * | 8/2007 | Karichev | H01M 4/8605 429/501 |
| 2008/0057368 A1 * | 3/2008 | McElroy | H01M 8/0252 429/414 |
| 2011/0008707 A1 * | 1/2011 | Muraoka et al. | 429/483 |
| 2011/0300467 A1 | 12/2011 | Spink et al. | |
| 2012/0164551 A1 * | 6/2012 | Faulkner et al. | 429/457 |

FOREIGN PATENT DOCUMENTS

| | | | |
|---|---|---|---|
| JP | 58-166677 A | | 10/1983 |
| JP | S 58166677 | * | 10/1983 |
| JP | 6-26184 U | | 4/1994 |
| JP | 2002-184243 A | | 6/2002 |
| JP | 2002184243 | * | 6/2002 |

(Continued)

OTHER PUBLICATIONS

International Search Report and Written Opinion for International Application No. PCT/US2013/044912 completed on Nov. 6, 2013.

Primary Examiner — Jonathan Crepeau
Assistant Examiner — Angela Martin
(74) Attorney, Agent, or Firm — Seed IP Law Group LLP

(57) ABSTRACT

An exemplary fuel cell component includes a plate comprising an electrically conductive material. An electrical connector includes a first portion embedded in the plate. A second portion of the electrical connector extends from the plate. The second portion is configured to make an electrically conductive connection with another device.

10 Claims, 2 Drawing Sheets

(56) References Cited

FOREIGN PATENT DOCUMENTS

| | | | |
|---|---|---|---|
| JP | 2006-040586 | * 2/2006 | ............. H01M 8/24 |
| JP | 2006040586 A | 2/2006 | |
| JP | 2006-156077 A | 6/2006 | |
| JP | 2006-210351 A | 8/2006 | |
| JP | 2007-265881 A | 10/2007 | |
| JP | 2010-218951 A | 9/2010 | |
| WO | 2005018025 A1 | 2/2005 | |

* cited by examiner

FUEL CELL COMPONENT WITH EMBEDDED POWER CONNECTOR

STATEMENT REGARDING FEDERALLY SPONSORED RESEARCH OR DEVELOPMENT

This invention was made with government support under Contract No. CA-04-7003-00 awarded by the Department of Transportation/Federal Transit Agency. The Government therefore has certain rights in this invention.

BACKGROUND

Fuel cells provide electricity from an electrochemical reaction. Typical fuel cell devices include a cell stack assembly of a plurality of individual fuel cell units. A current collector at an end of the cell stack assembly collects current resulting from the electrochemical reaction. An end plate is typically placed against the current collector. The end plate is often used as a pressure plate that is part of a structure for holding the cell stack assembly together.

Obtaining the electrical energy from the fuel cell is typically accomplished by attaching a connector to the end plate. A mechanical connection using a fastener such as a bolt establishes an electrically conductive connection at the end plate. While such arrangements have proven effective and useful, they are not without drawbacks. The mechanical connection points introduce the possibility for a potential voltage loss across the connection. Additionally, it is possible for there to be heat buildup at the mechanical connections. The mechanical connections also introduce additional labor time and are subject to assembly error.

SUMMARY

An exemplary fuel cell component includes a plate comprising an electrically conductive material. An electrical connector includes a first portion embedded in the plate. A second portion of the electrical connector extends from the plate. The second portion is configured to make an electrically conductive connection with another device.

An exemplary fuel cell device includes a cell stack assembly comprising a plurality of fuel cells. An end plate at one end of the cell stack assembly comprises an electrically conductive material. An electrical connector includes a first portion embedded in the end plate. A second portion of the electrical connector extends from the end plate. The second portion is configured to make an electrically conductive connection with another device.

An exemplary method of making a fuel cell component includes forming a plate comprising an electrically conductive material. A first portion of an electrically conductive connector is embedded in the plate with a second portion of the connector extending from the plate.

The various features and advantages of a disclosed example embodiment will become apparent to those skilled in the art from the following detailed description. The drawings that accompany the detailed description can be briefly described as follows.

DETAILED DESCRIPTION

Figure 1:
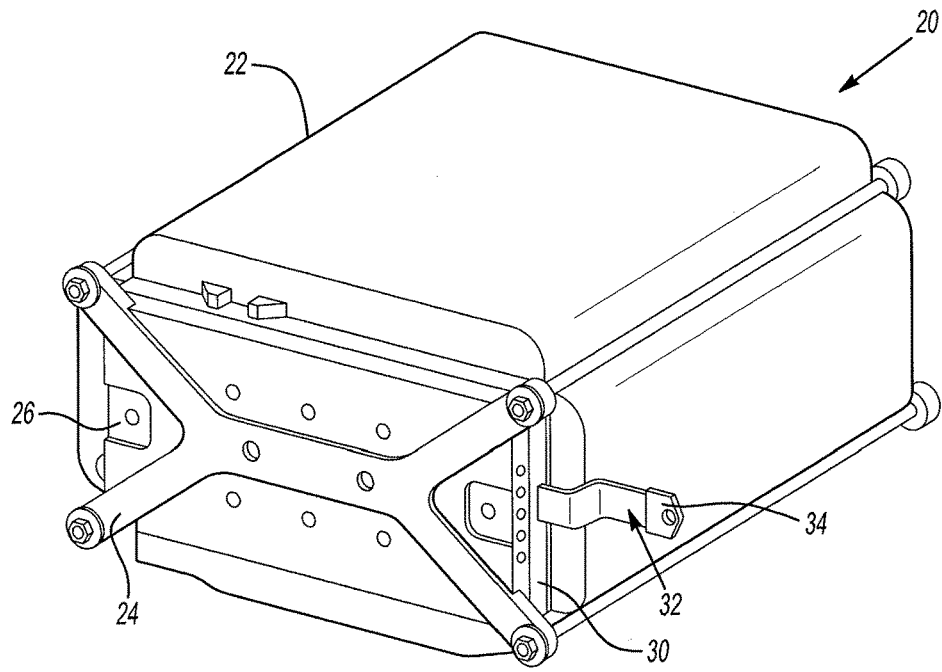
FIG. 1 illustrates an example fuel cell device designed according to an embodiment of this invention.

FIG. 1 illustrates a fuel cell device 20 that is useful for generating electricity based on an electrochemical reaction. A cell stack assembly 22 includes a plurality of individual fuel cell units arranged in a known manner. A structure 24 includes a pressure plate 26 for holding the cell stack assembly 22 together.

An end plate 30 is received between the pressure plate 26 and the cell stack assembly 22. The end plate 30 comprises an electrically conductive material. In one example, the electrically conductive material is carbon-based. One example end plate 30 comprises graphite.

The end plate 30 is configured as a current collector for collecting electrical current generated within the cell stack assembly 22.

Figure 2:
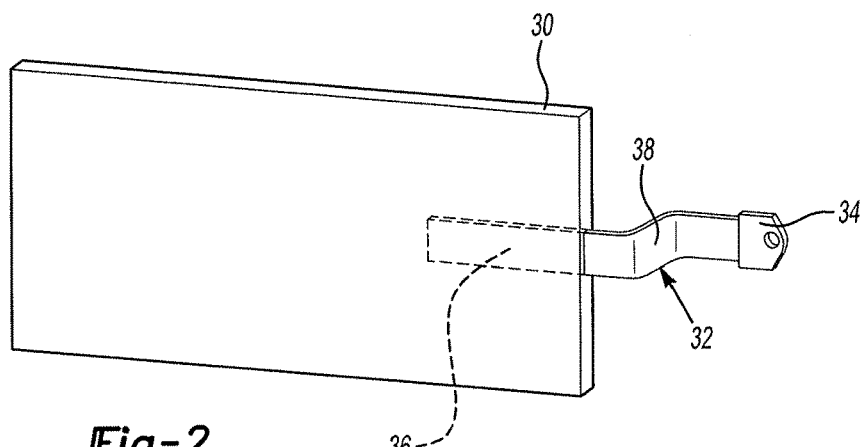
FIG. 2 illustrates an example fuel cell component designed according to an embodiment of this invention.

FIG. 2 illustrates the end plate 30. The end plate 30 includes an electrically conductive connector 32 embedded within the end plate 30. The electrically conductive connector 32 has an end 34 that is configured for making an electrically conductive connection with another device, such as a load to be powered by the fuel cell device 20. The electrically conductive connector 32 includes a first portion 36 that is embedded within the end plate 30. A second portion 38 of the electrically conductive connector 32 extends from the plate 30.

In one example, the first portion 36 of the connector 32 is completely surrounded by the material of the plate 30. In another example, the first portion 36 is at least partially encased by the material of the plate 30.

Figure 3:
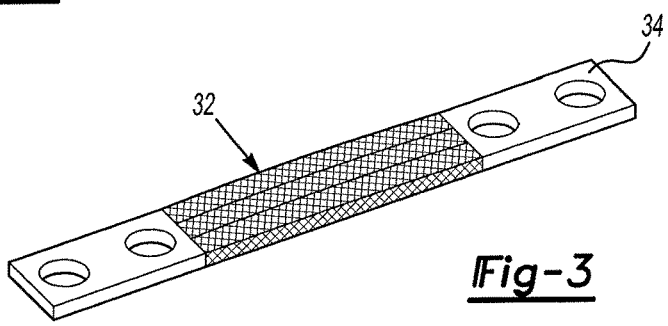
FIG. 3 illustrates an example electrically conductive connector.

FIG. 3 illustrates an example electrically conductive connector 32. This example comprises a plurality of strands of flexible wire. The entire connector 32 is flexible in this example. Some examples include generally flat connectors that have a length that is greater than a width of the connector. The width is greater than a thickness of the connector.

The example of FIG. 3 comprises a braided wire configuration. There are spacings between some of the wire strands of the connector 32. In one example, when the connector 32 is embedded within the plate 30, at least some of the electrically conductive material of the plate 30 is received within the spacings between various strands of the connector 32. With the electrically conductive material surrounding and at least partially infiltrating the body of the connector 32, a more reliable mechanical connection is established between the material of the plate 30 and the connector 32. The electrically conductive material received within the spacings between the wire strands of the connector 32 increases the amount of surface contact for enhancing the electrically conductive connection between the material of the plate 30 and the connector 32.

Figure 4A:
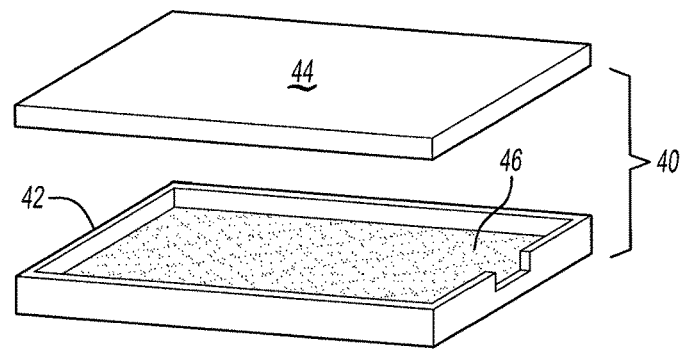
FIGS. 4A-4D schematically illustrate an example method of making a fuel cell component such as the example of FIG. 2.
Figure 4B:
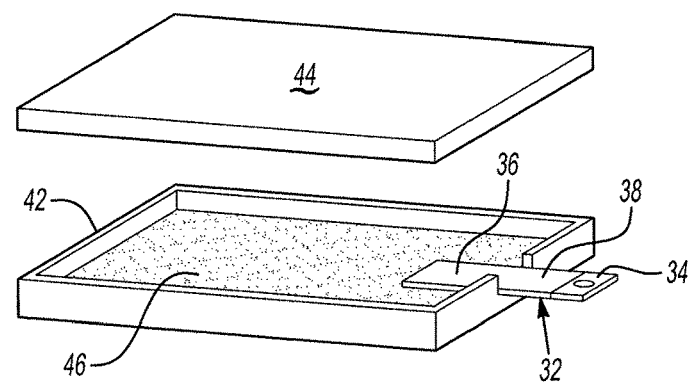
Figure 4C:
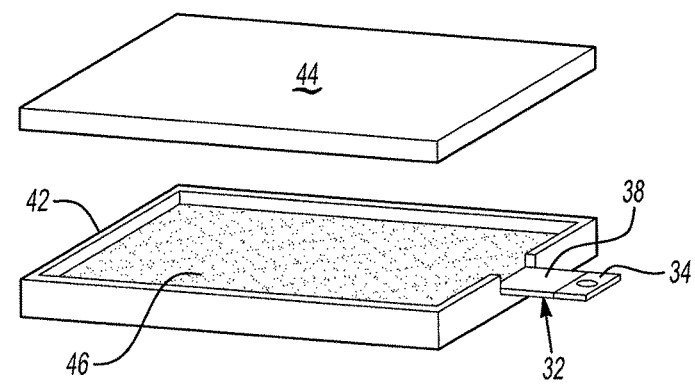
Figure 4D:
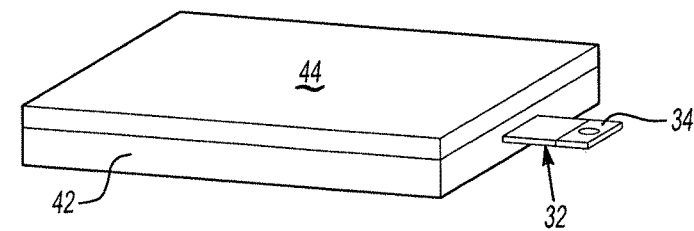

FIGS. 4A-4D schematically illustrate an example method of making a fuel cell component such as the example plate 30. A mold 40 includes mold portions 42 and 44. In the illustrated example, the mold portion 42 is configured as a tray into which a moldable form of the electrically conductive material may be deposited. In the example of FIG. 4A, a powder form of the electrically conductive material, such as graphite, is placed within the mold portion 42. As shown in FIG. 4B, at least the first portion 36 of the connector 32 is situated within the mold portion 42. As shown in FIG. 4C, additional electrically conductive material 42 is added to the mold portion 42. In this example, the additional electrically conductive material completely covers over the first portion 36 of the connector 32.

Once the desired amount of the moldable electrically conductive material 46 is within the mold 40, the second mold portion 44 and the first mold portion 42 are brought together for forming the plate 30. In one example, heat and pressure are applied to form a solid plate 30 with the first portion 36 of the connector 32 embedded within the material of the plate.

The disclosed example eliminates a requirement for making a mechanical connection between a conductive connector and a fuel cell device. The plate 30 with the integrated electrical connector 32, therefore, eliminates potential sources of heat buildup, voltage loss, assembly error or a combination of these. The embedded connector 32 reduces the number of components that need to be handled and the amount of time required during fuel cell device assembly. With the illustrated example, separate current collector and end plates are not required, which provides further cost savings.

Eliminating any need for a separate metal current collector plate provides another benefit. In examples that include a non-porous, graphite end plate 30, there is no concern about corrosion such as that which may occur if a metal current collector plate were used.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A fuel cell assembly, comprising:
   a cell stack assembly including a plurality of fuel cells stacked in a longitudinal direction; and
   a fuel cell component including:
      an end cell plate arranged at an end of the cell stack assembly, the end cell plate including an electrically conductive material disposed therein, the electrically conductive material comprising at least one of carbon and graphite; and
      an electrical connector including:
         a first portion including one or more exterior surfaces which define an outer periphery of the electrical connector, the outer periphery completely extending around the first portion, the outer periphery of the first portion being fully surrounded by the electrically conductive material of the end cell plate;
         a second portion extending from the end cell plate, the second portion being configured to make an electrically conductive connection with another device; and
         a plurality of flexible wire strands with spacing between at least some of the wire strands, wherein some of the electrically conductive material of the end cell plate is received in the spacing.

2. The fuel cell assembly of claim 1, wherein the end cell plate is configured as a current collector for the end of the cell stack assembly.

3. The fuel cell assembly of claim 1, wherein the plurality of flexible wire strands of the electrical connector are provided in the form of a braided cable.

4. The fuel cell assembly of claim 1, wherein
   the electrical connector has a length, a width and a thickness;
   the thickness and the width are generally perpendicular to the length; and
   the width is greater than the thickness.

5. A fuel cell device, comprising
   a cell stack assembly including a plurality of fuel cells stacked in a longitudinal direction;
   an end cell plate at one end of the cell stack assembly, the end cell plate including an electrically conductive material disposed therein, the electrically conductive material comprising at least one of carbon and graphite; and
   an electrical connector including:
      a first portion having including exterior surfaces which define an outer periphery of the electrical connector, the outer periphery completely extending around the first portion, and the outer periphery of the first portion being fully surrounded by the electrically conductive material of the end cell plate;
      a second portion extending from the end cell plate, the second portion being configured to make an electrically conductive connection with another device; and
      a plurality of flexible wire strands with spacing between at least some of the wire strands, wherein some of the electrically conductive material of the end cell plate is received in the spacing.

6. The device of claim 5, wherein the end cell plate is configured as a current collector at the end of the cell stack assembly.

7. The device of claim 5, wherein the plurality of flexible wire strands of the electrical connector are provided in the form of a braided cable.

8. The device of claim 5, wherein
   the electrical connector has a length, a width and a thickness;
   the thickness and the width are generally perpendicular to the length; and
   the width is greater than the thickness.

9. A method of making a fuel cell component, comprising:
   forming an end cell plate that is sized and shaped to be arranged at an end of a cell stack assembly of a fuel cell assembly, the cell stack assembly including a plurality of fuel cells stacked in a longitudinal direction, the end cell plate comprising an electrically conductive material disposed therein, and the electrically conductive material comprising at least one of carbon and graphite;
   embedding a first portion of an electrically conductive connector in the end cell plate with a second portion of the connector extending from the end cell plate, the embedding including fully surrounding exterior surfaces of the first portion with the electrically conductive material of the end cell plate, the exterior surfaces defining an outer periphery of the electrical connector which outer periphery completely extends around the first portion; and
   introducing some of the electrically conductive material of the end cell plate into spacing between at least some of a plurality of flexible wire strands of the electrically conductive connector.

10. The method of claim 9, further comprising:
    introducing a powder including the electrically conductive material into a mold;
    situating the first portion of the connector in the mold; and applying heat and pressure to the powder in the mold while the first portion is in the mold.

\* \* \* \* \*